(12) United States Patent
Hasegawa

(10) Patent No.: US 8,026,922 B2
(45) Date of Patent: Sep. 27, 2011

(54) DATA INPUT DEVICE AND DISPLAY LAYOUT METHOD FOR THE SAME

(75) Inventor: Hiroyasu Hasegawa, Kanagawa (JP)

(73) Assignee: NEC Infrontia Corporation, Kawasaki-Shi, Kanagawa (JP)

( * ) Notice: Subject to any disclaimer, the term of this patent is extended or adjusted under 35 U.S.C. 154(b) by 956 days.

(21) Appl. No.: 11/260,276

(22) Filed: Oct. 28, 2005

(65) Prior Publication Data

US 2006/0092180 A1    May 4, 2006

(30) Foreign Application Priority Data

Oct. 29, 2004  (JP) ................................. 2004-315761

(51) Int. Cl.
*G09G 5/00* (2006.01)

(52) U.S. Cl. ........ 345/581; 345/168; 345/156; 345/157; 345/158; 345/160

(58) Field of Classification Search .................. 345/629, 345/168, 158, 581, 156, 157, 159, 160
See application file for complete search history.

(56) References Cited

U.S. PATENT DOCUMENTS

| | | | | |
|---|---|---|---|---|
| 5,574,482 A | * | 11/1996 | Niemeier | 345/173 |
| 5,812,117 A | * | 9/1998 | Moon | 345/169 |
| 5,936,614 A | * | 8/1999 | An et al. | 345/173 |

FOREIGN PATENT DOCUMENTS

| | | |
|---|---|---|
| JP | 63-030926 A | 2/1988 |
| JP | 2-051720 A | 2/1990 |
| JP | 4-281514 A | 7/1992 |
| JP | 5-113842 A | 5/1993 |
| JP | 7-093078 A | 4/1995 |
| JP | 10-175014 | 1/2000 |
| JP | 11-058336 | 9/2000 |
| JP | 2000-011248 | 7/2001 |

* cited by examiner

*Primary Examiner* — Mike Rahmjoo

(74) *Attorney, Agent, or Firm* — Dickstein Shapiro LLP

(57) ABSTRACT

A data input device and a display layout method for the same, which permit quickly laying out plural display keys for inputting data by touching these keys. The location of a base key, the spaces between adjacent keys other than the base key and a key alignment parameter for the set/release of the base key are appropriately changeably set, and plural keys are displayed on the display screen. From these keys a base key is selected by the touch, the location of the base key is determined, and other keys in groups related to the base key are laid out at predetermined distances by touching them.

9 Claims, 7 Drawing Sheets

FIG. 2A

|   | SETTING ITEMS | STTING VALUES |
|---|---|---|
| 1 | SETTING FOR SIDE ALIGNMENT OF BASE KEY (UPPER, LOWER, LEFT, RIGHT) | UPPER |
| 2 | SETTING FOR VERTICAL SPACE BETWEEN ADJACENT KEYS | 10 |
| 3 | STTING FOR HORIZONTAL SPACE BETWEEN ADJACENT KEYS | 20 |
| 4 | "SET"OR "RELEASE" OF BASE KEY | RELEASE |

DATA INPUT DEVICE AND DISPLAY LAYOUT METHOD FOR THE SAME

FIELD OF THE INVENTION

This invention relates to a data input device and a display layout method for the same, more particularly to a data input device and a display layout method for the same, in which at the time of POS (point of sales) application sales display production after disposition of keys, labels, etc. (hereinafter referred to as keys), the operator can make easy and quick key arrangement disposition (or layout) as desired.

BACKGROUND OF THE INVENTION

For inputting a large quantity of data to a data processing unit such as a personal computer, various data input devices have been developed and are widely used in various fields. Because of ever-lasting increasing trends of the data processing rate and the quantity of data capable of being dealt with in such data processing unit, the data input to the data input device is required to be made easily and quickly as well as being highly accurate.

A typical data input device is POS terminals, which are used in retail stores, such as supermarkets or convenience stores, for making payment when customers bring commodities chosen by them to cash desks in the stores.

The data input (or registration) in such POS terminal is usually executed with a keyboard operable for data input by a salesclerk or a bar code reader for optically reading out bar codes attached to commodities. However, in canteens, family restaurants, fast food shops, etc., in which relatively limited commodities (or menu) are prepared and provided by quickly preparing or cooking in response to customer's orders, it is impossible to quickly input data to a bar code reader or the like because no bar ode is attached to such commodities. Accordingly, data input with so-called "touch display" or "soft keys" is convenient, in which when the operator touches a predetermined part of a liquid crystal display panel (i.e., LCD) of a data input device, data corresponding to the touched part is inputted (or registered).

As shown, the data input in such touch display system is such that letters, drawings, photographs or their combinations are displayed on plural parts of the display screen and that the data touched by the operator is inputted. Thus, it ensures excellent data input operability, and it is possible to input data quickly and accurately (i.e., with least input errors) as compared to the data input by any other method.

However, as for the data input based on the touch display, since the display area (or the display space) is finite, the number of keys that can be displayed (i.e., can be selected for display) at a time is also limited. Accordingly, it is practically typical that a plurality of displays with necessary key dispositions therein are prepared and switched to input necessary commodities (or data).

For example, in hamburger shops or the like, a display of "hamburgers", a display of "fries", a display of "drinks", a display of "sub-menus", a display "for manager", etc. are prepared so that they are switched by the operator to input data every time commodities are sold depending on the category of commodities to be provided in such shops.

Prior art techniques in or relevant to such technical field are disclosed in some literatures. For example, a free key layout setting system is disclosed, in which the number of keys, key size, key shape, etc. in the free key layout setting can be readily changed (see JP2000-10689A1). Also, a position aligner and a recording medium for realizing the position aligning of complicated drawings, rows of characters, symbols, etc. in a simple operation are disclosed (see JP2000-259846A1). Furthermore, a method of and a system for changing POS operation display are displayed, which permit changing dispositions and operation functions in operating parts, a display screen, etc. of a POS terminal (see JP2001-202570A1).

In the prior art display layout aligning technique, subsequent to disposition of keys on the display screen, a rough layout is made by dragging and/or dropping, and fine position adjustment of each key is made by using an arrow key or the like. However, in this technique, enormous operations equal to the number of keys multiplied by the fine adjustments of each key are generated. Therefore, it requires a great deal of labor and time in POS displays or the like to produce various displays on the display screen.

SUMMARY OF THE INVENTION

The invention was made in view of the above problems inherent in the prior art, and its primary object is to provide data input device and display layout method for the same capable of overcoming or alleviating the above problems.

In order to solve the above problems, the data input device and the display layout method according to the present invention take the following unique constructions:

One aspect of the present invention is a data input device operable for arranging or laying out, in response to the user's touch on a display screen of a display device such as a liquid crystal display panel, plural display keys for inputting the corresponding data to locations desired by the user, comprising: selection means for selecting one of plural keys displayed on the display screen as a base key and also selecting the location to be aligned; key space setting means for setting the space between adjacent keys with respect to the base key; and set/release means for selecting either setting or releasing of the base key.

According to preferred embodiments of the data input device, the space setting means comprises vertical and horizontal key space setting means for respectively setting vertical and horizontal key spaces to different values. The selection means selectively sets the location of the base key with respect to either one of the upper, lower, left and right sides of the display screen. A line is displayed on the display screen in correspondence to one of the upper, lower, left and right sides selected by the selection means. The settings by the setting means and the key space setting means can be arbitrarily changed by the user.

Another aspect of the present invention is a display layout method for data input device comprising the steps of: freely displaying plural keys on the display screen; selecting by the touch one of the plural displayed display keys as a base key for disposition thereof at a desired location; and preliminarily setting the spaces of the touched display keys other than the base key, thereby automatically providing the space thereof with respect to the disposition of the base key.

According to preferred embodiments of the display layout method for data input device, the plural display keys are aligned for each of plural groups by successively selecting keys as the base keys. The space between the display keys can be arbitrarily set for each group.

With the data input device and display layout method for the same according to the invention, the following practically pronounced advantage is obtainable. That is, it is possible to quickly layout a plurality of display keys to predetermined positions in less operation steps.

In case of laying-out, for example, 9 display keys will be considered. Assuming that the number of steps of moving a key and subsequent fine adjustments (such as dragging and dropping) is 5, the optimum layout of all (i.e., 9) keys requires 45 (=5×9) steps, thereby requiring a considerably long time which depends on the operator's skill or familiarization. In contrast, according to the present invention, the necessary number of steps is only 17, i.e., (moving the base keys)+4 (setting change)+8 (touch of the remaining keys), thereby accomplishing the necessary key layout with significantly less number of steps equal to slightly less than 40%. Besides, since the touching of the remaining keys is not prudent one requiring fine adjustment, it ensures quick layout. Furthermore, with increase of the number of keys, the reduction of the operation steps is significant.

BRIEF DESCRIPTION OF THE DRAWINGS

The construction, operation, advantages and objects of the present invention will become apparent from the following detailed descriptions made with reference to the accompanying drawings, in which:

FIG. 2A is an illustration for describing the layout of the plural keys (step 1);

DESCRIPTION OF PREFERRED EMBODIMENTS

Figure 1:
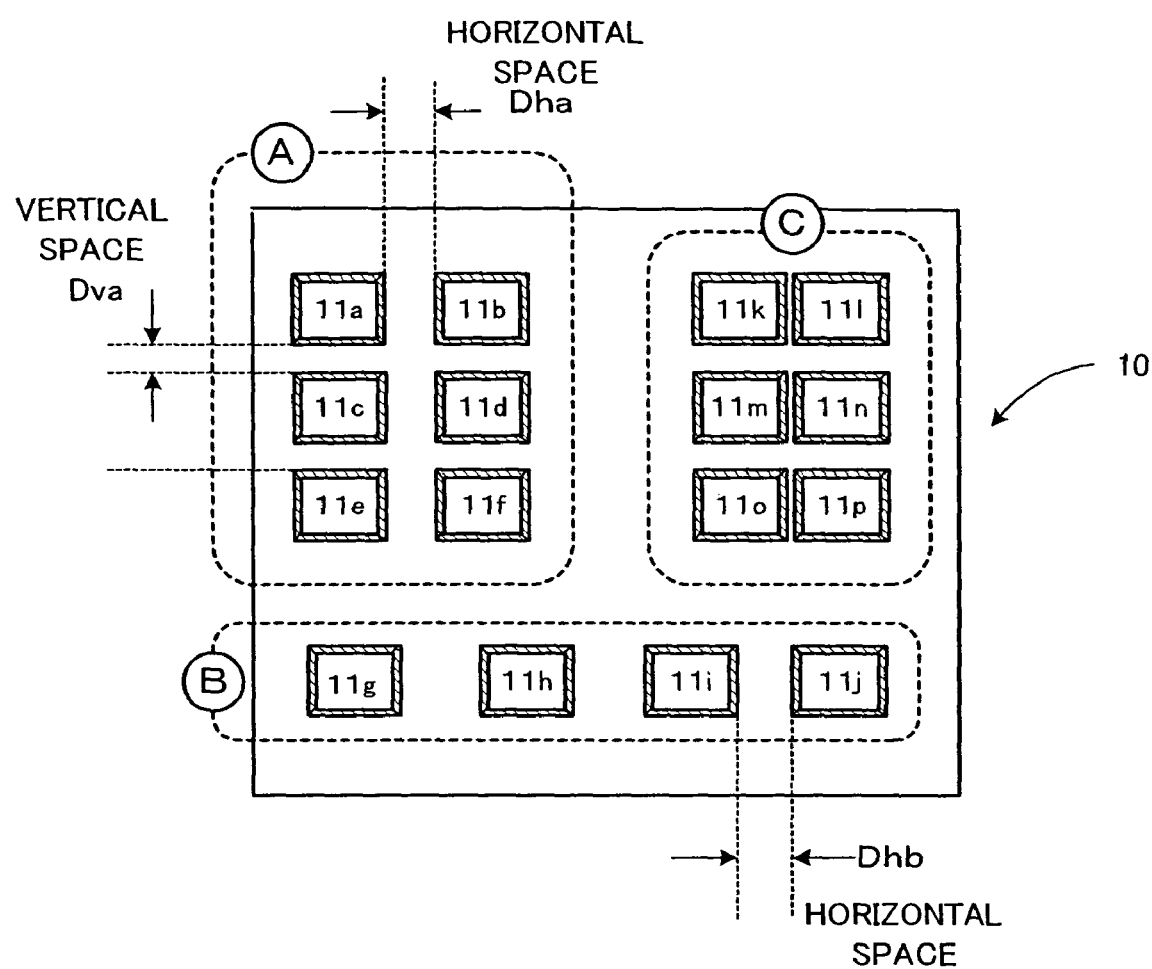
FIG. 1 is an example of a display for laying out plural keys.

Now, FIG. 1 shows an example of the display layout in the data input device according to the invention. This data input device has a substantially rectangular display screen 10. In this particular example, the display screen 10 has six keys 11a-11f in a group A at an upper left part, four keys 11g-11j in a group in a group B at a lower horizontal part, and six keys 11k-11p in a group C at an upper right part, thereby 16 keys in total.

For example, in case of the aforementioned hamburger shop, the group A is hamburger kind data, the group B is side order data such as salad and potato. And the group C is drinks data such as coffee (hot or ice) and ice tea. With this layout, it is possible to input data accurately and quickly in according with customers' orders.

According to the present invention, vertical and horizontal spaces between adjacent keys of the plural keys displayed on the display screen can be easily set for each group as described in detail hereinafter. Also, these spaces can be set to different values for different groups. In the example as shown in FIG. 1, the vertical space between adjacent keys, for instance between the keys 11a and 11c in the group A, is set to Dva. The horizontal space between adjacent keys, for instance between the keys 11a and 11b, is set to Dha. On the other hand, the horizontal space between the adjacent keys 11g to 11j in the group B is set to Dhb.

Now, the display layout method for the data input device according to the present invention will be described step by step with reference to FIGS. 2A to 2G.

FIG. 2A is an illustration to show step 1. In step 1, parameters of the key arrangement or layout are set (these values may be changed at any time). In this particular embodiment, four parameter setting items are provided. Item 1 is a setting for the side alignment of a base key on the display screen 10. As shown in FIG. 2A, the setting value is appropriately selected from the four setting values of the upper, lower, left and right sides. Item 2 and item 3 are settings for spaces between adjacent keys. More specifically, item 2 is the setting for the vertical space between adjacent keys, i.e., vertically arranged keys, and item 3 is the setting for the horizontal space between adjacent keys, i.e., horizontally arranged keys. In the example as shown in FIG. 2A, the vertical space is set to "10", and the horizontal space is set to "20". The last item 4 is the set/release for the base key. The operator (or user) selectively sets the "set" or "release" for the base key. In the example of FIG. 2A, the "release" is selected.

Figure 2B:
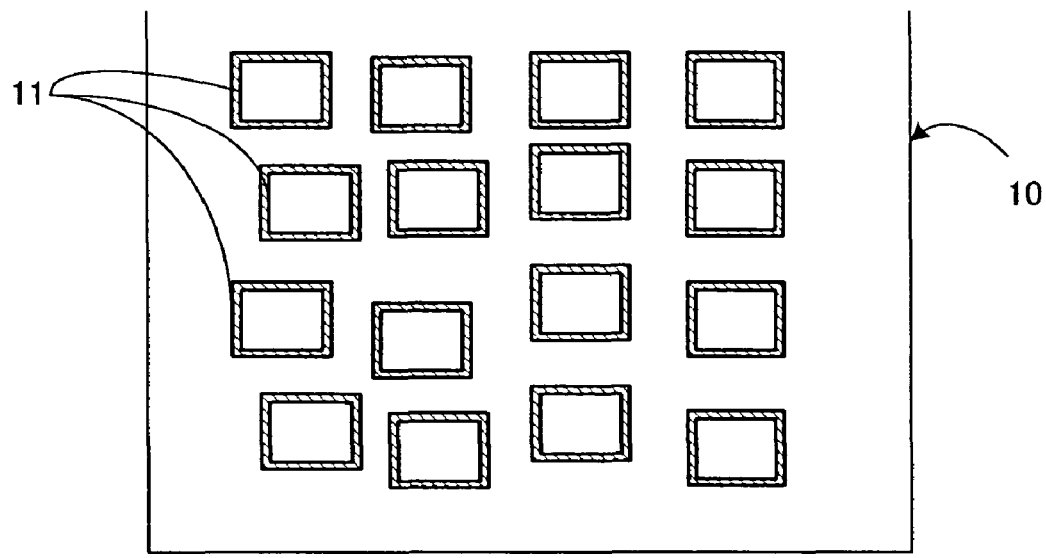
FIG. 2B is an illustration for describing the layout of the plural keys (step 2)

Then, FIG. 2B is an illustration of the display on the display screen 10 in step 2. In step 2, plural (i.e., 16 in this example) keys 11a-11p (hereinafter reference numeral 11 is used for collectively referring to these keys) desired to be displayed are displayed randomly on the blank display screen 10. Thus, step 2 is to freely dispose keys on the blank display.

Figure 2C:
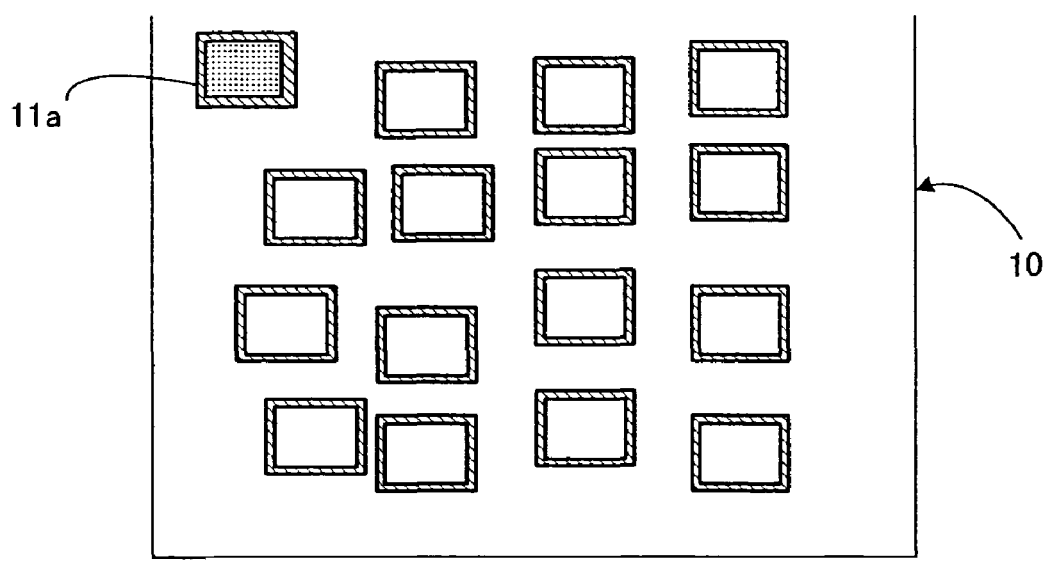
FIG. 2C is an illustration for describing the layout of the plural keys (step 3)

Then, FIG. 2C is an illustration of the display on the display screen 10, in which a base key is selected (step 3). The operator selects the base key (i.e., the upper left key) 11a in the group A, and moves it to a desired location.

Figure 2D:
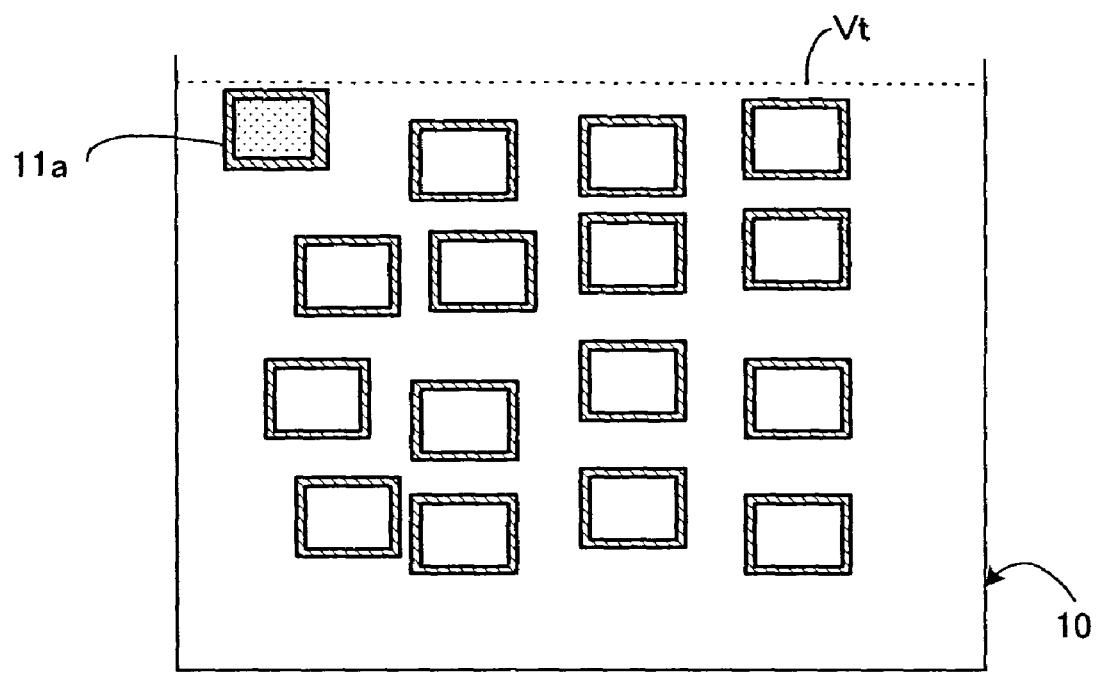
FIG. 2D is an illustration for describing the layout of the plural keys (step 4)

Then, FIG. 2D is an illustration of the display on the display screen 10 (in step 4). In step 4, the operator selects the base key in the selection item 4, i.e., the key 11a, and touches this key. In the setting item 1, it is set so that the base key is to be aligned with the "upper side". The base key 11a is thus aligned with the "upper side". At this time, a line Vt corresponding to the "upper side" selected for alignment is displayed on the display screen 10. The base key 11a touched by the operator is thus automatically aligned with the line Vt for the "upper side". This means that the operator is no need to make a fine adjustment of the display location of the base key 11a.

Figure 2E:
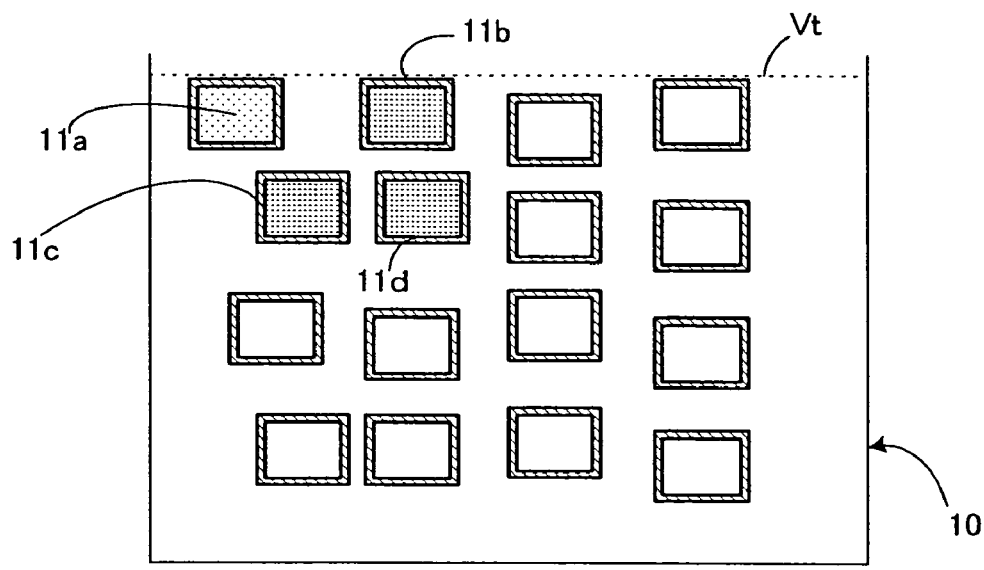
FIG. 2E is an illustration for describing the layout of the plural keys (step 5)
Figure 2E:
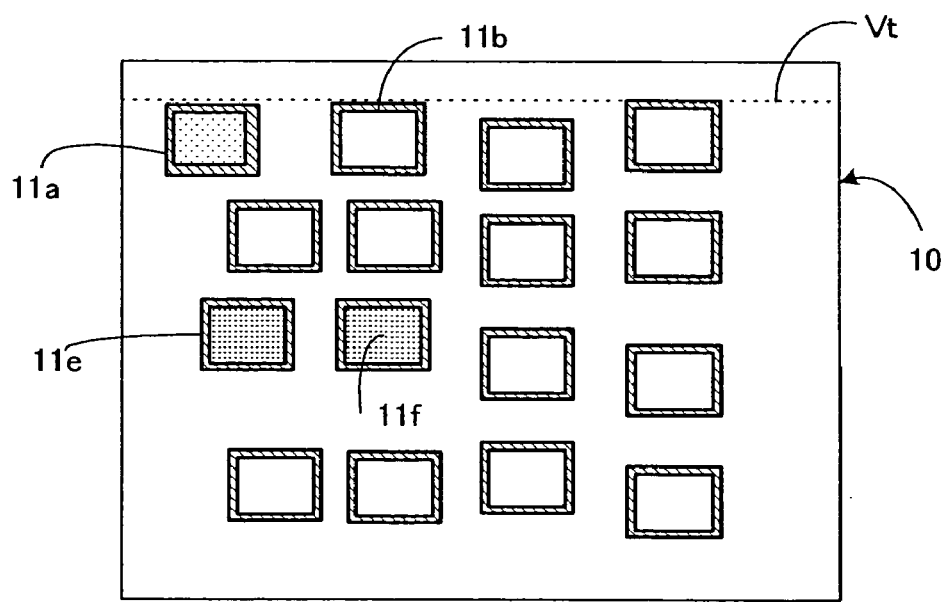

Then, FIGS. 2E(a) and 2E(b) show the displays on the display screen 10 in step 5. In the setting item 2, the vertical space between adjacent keys is set to "10", and as shown in FIG. 2E (a), when the operator touches the key 11b, the key 11b is aligned with the line Vt for the "upper side" similar to the base key 11a. The keys 11c and 11d in the second row from the top are disposed at the vertical space of "10" from the base key 11a. When the operator touches the keys 11e and 11f in the third row from the top as shown in FIG. 2E (b), these keys are also disposed at the vertical space of "10" from the keys 11c and 11d in the second row from the top. In this manner, step 5 is to touch any key desired to be aligned with the upper side with respect to the base key.

Figure 2F:
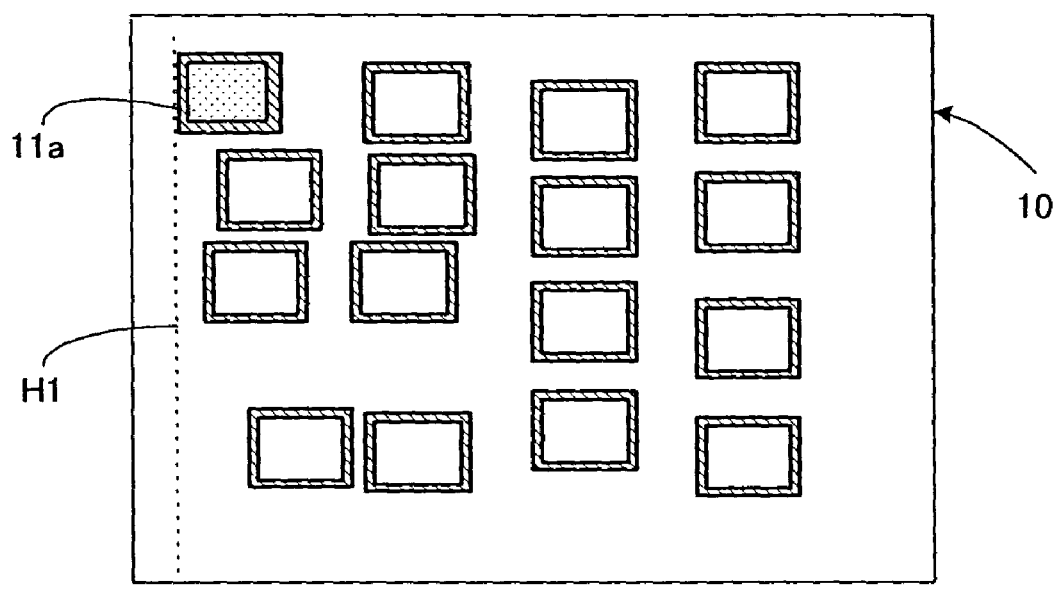
FIG. 2F is an illustration for describing the layout of the plural keys (step 6)

Then, FIG. 2F shows a display on the display screen 10 in step 6. In step 6, the setting in the setting item 1 is changed to the "left side". Here, a line Hl for aligning keys is displayed on the display screen 10.

Figure 2G:
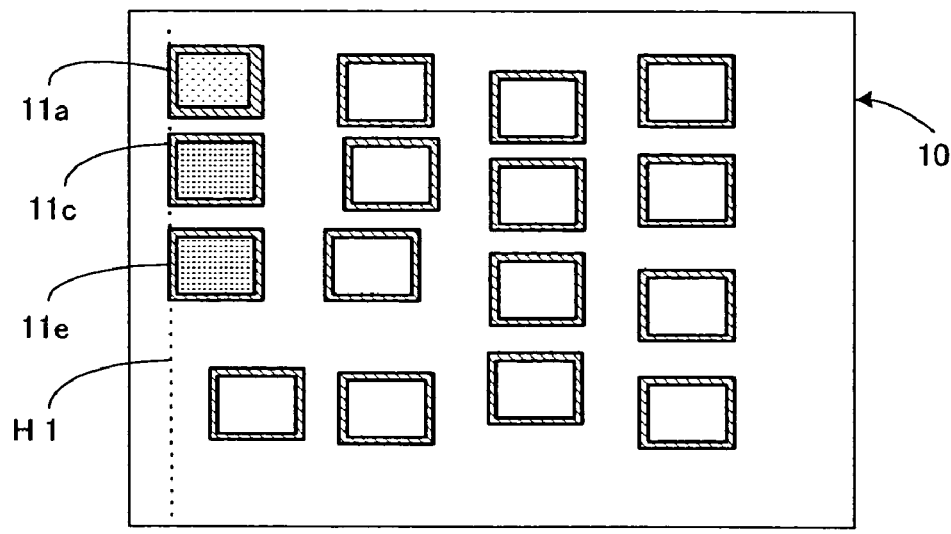
FIG. 2G is an illustration for describing the layout of the plural keys (step 7).
Figure 2G:
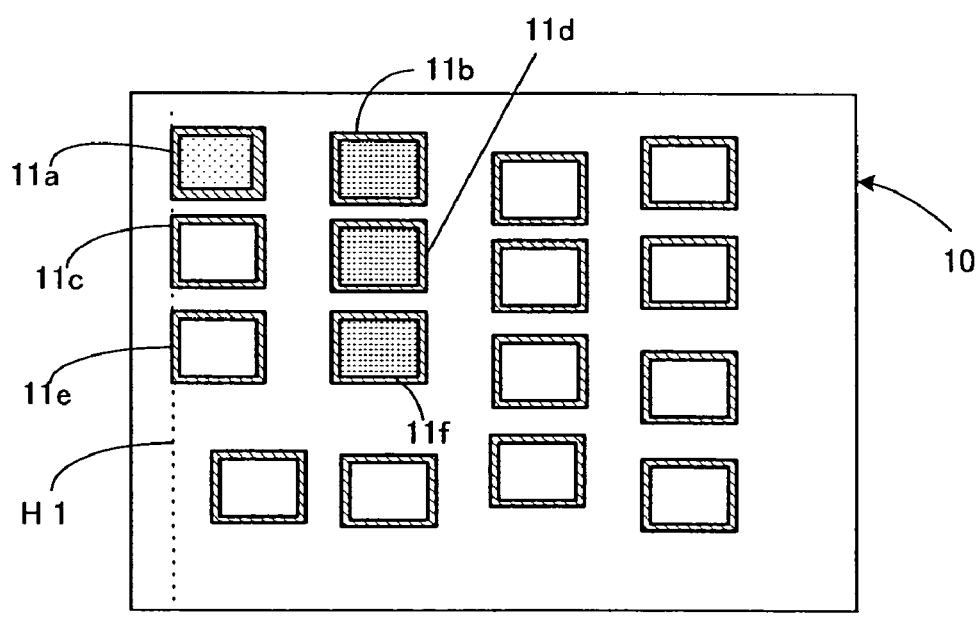

Finally, FIGS. 2G(a) and 2G(b) show displays on the display screen 10 in step 7. When the operator touches the base key 11a, as shown in FIG. 2G(a), the key 11a is aligned with the aforementioned lines Vt and Hl. Likewise, when the operator touches the keys 11c and 11e, these keys are aligned with the "left side" while their vertical space Dva is maintained. Furthermore, when the operator touches the keys 11b, 11d and 11f as shown in FIG. 2G(b), these keys are moved to predetermined respective locations, while the vertical-space Dha is maintained with respect to the keys 11*a*, 11*c* and 11*e*.

In the above steps 1-7, the operator lays out the six keys 11*a*-11*f* in the group A to the desired locations. Likewise, the operator disposes or lays out the four keys 11*g*-11*j* in the group B and the six leys 11*g*-11*p* in the group C to desired locations by repeating the above steps. However, in case of the keys 11*g*-11*j* in the group B, which are arranged in a row (or horizontally), the setting of the vertical space in the setting item 2 can be omitted. Although not present in this example, in case of arranging or laying out plural keys in a vertical row, the horizontal space between adjacent keys in the setting item 3 can be omitted.

Although the preferred embodiment of the data input device and the display layout method for the same according to the invention have been described, it is given as a mere example of the present invention and is by no means limitative. Also, it is quite obvious to a person having an ordinary skill in the art that the above various selection and setting means can be realized by a personal computer or CPU (central processing unit) and an associated memory for storing process programs and data. Furthermore, it will be easily understood by a person having an ordinary skill in the art that various changes and modifications can be made for particular applications without departing from the scope of the invention. While in the above description it has been described that plural of keys are disposed or laid out on in the display screen, the term "keys" do not necessarily mean mere blocks but also cover labels and photographs.

What is claimed is:

1. A data input device operable for arranging or laying out, in response to a user's touch on a display screen on a display device, plural display keys at display locations, comprising:
    selection means for selecting one of the plural keys included in a group of display keys displayed on the display screen as a base key for the group and also selecting a location to be aligned, wherein the display device displays a plurality of groups and the base key and the location can be selected for each group;
    key space setting means for setting a space between adjacent keys with respect to the base key in each group; and
    set/release means for selecting either setting or releasing of each base key.

2. A data input device according to claim 1, wherein the key space setting means comprises vertical and horizontal key space setting means for respectively setting vertical and horizontal key spaces to different values.

3. A data input device according to claim 2, wherein the settings by the selecting means and the key space setting means are capable of being changed by the user.

4. A data input device according to claim 1, wherein the settings by the selecting means and the key space setting means are capable of being changed by the user.

5. A data input device according to claim 1, wherein the selection means selectively sets the location of the base key with respect to either one of the upper, lower, left and right sides of the display screen.

6. A data input device according to claim 5, wherein a line is displayed on the display screen in correspondence to one of the upper, lower, left and right sides selected by the selection means.

7. A data input device according to claim 6, wherein the settings by the selecting means and the key space setting means are capable of being changed by the user.

8. A display layout method for a data input device comprising:
    freely displaying plural display keys on a display screen;
    selecting by touch one of the plural displayed display keys included in a group of display keys as a base key for disposition thereof at a desired location; and
    preliminarily setting the spaces of the display keys other than the base key in said group, thereby automatically providing the space thereof with respect to the disposition of the base key, wherein the plural display keys are aligned for each of a plurality of groups by successively selecting a plurality of base keys.

9. A display layout method for data input device according to claim 8, wherein the space between the display keys are capable of being set for each group.

* * * * *